United States Patent
Jokela et al.

(10) Patent No.: US 7,873,825 B2
(45) Date of Patent: Jan. 18, 2011

(54) IDENTIFICATION METHOD AND APPARATUS FOR ESTABLISHING HOST IDENTITY PROTOCOL (HIP) CONNECTIONS BETWEEN LEGACY AND HIP NODES

(75) Inventors: Petri Jokela, Espoo (FI); Pekka Nikander, Helsinki (FI); Patrik Mikael Salmela, Kirkkonummi (FI); Jari Arkko, Kauniainen (FI); Jukka Ylitalo, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 134 days.

(21) Appl. No.: 10/599,761

(22) PCT Filed: Apr. 15, 2004

(86) PCT No.: PCT/EP2004/050533

§ 371 (c)(1),
(2), (4) Date: Oct. 6, 2006

(87) PCT Pub. No.: WO2005/101753

PCT Pub. Date: Oct. 27, 2005

(65) Prior Publication Data

US 2007/0204150 A1   Aug. 30, 2007

(51) Int. Cl.
*H04L 29/06* (2006.01)
(52) U.S. Cl. ........................ 713/153; 709/227
(58) Field of Classification Search .................. None
See application file for complete search history.

(56) References Cited

U.S. PATENT DOCUMENTS 6,061,346 A * 5/2000 Nordman ................. 370/352
6,101,549 A * 8/2000 Baugher et al. ............ 709/238
6,973,057 B1 * 12/2005 Forslow .................... 370/328
7,346,771 B2 * 3/2008 Narayanan ................ 713/153

(Continued)

FOREIGN PATENT DOCUMENTS

EP           840482 A1 *  5/1998
WO     WO 0150702 A2 *  7/2001

OTHER PUBLICATIONS

Nikander et al., End-Host Mobility and Multi-Homing with Host Identity Protocol, Jun. 17, 2003, Networking Working Group, Internet-Draft 00, pp. 1-43.*

(Continued)

*Primary Examiner*—William R Korzuch
*Assistant Examiner*—Michael R Vaughan

(57) ABSTRACT

A method of using the Host Identity Protocol (HIP) to at least partially secure communications between a first host operating in a first network environment and a second, HIP-enabled, host operating in a second network environment, with a gateway node forming a gateway between the two environments. An identifier is associated with the first host, stored at the gateway node, and sent to the first host. The identifier is then used as a source address in a subsequent session initiation message sent from the first host to the gateway node, having an indication that the destination of the message is the second host. The stored identifier at the gateway node is then used to negotiate a secure HIP connection to the second host. The first network environment may be a UMTS or GPRS environment, in which case the gateway node may be a Gateway GPRS Support Node (GGSN).

23 Claims, 11 Drawing Sheets

U.S. PATENT DOCUMENTS

| | | | | |
|---|---|---|---|---|
| 2002/0057662 | A1* | 5/2002 | Lim | 370/338 |
| 2002/0080030 | A1* | 6/2002 | Inomata | 340/542 |
| 2002/0156867 | A1* | 10/2002 | Iwami | 709/218 |
| 2004/0091117 | A1* | 5/2004 | Narayanan | 380/277 |
| 2005/0160183 | A1* | 7/2005 | Valli et al. | 709/245 |
| 2007/0274312 | A1* | 11/2007 | Salmela et al. | 370/392 |
| 2008/0271132 | A1* | 10/2008 | Jokela et al. | 726/10 |

OTHER PUBLICATIONS

Nikander et al., Integrating Security, Mobility, and Multi-homing in a HIP Way, 2003, in Network and Distributed Systems Security Symposium, pp. 1-14.*

Wall et al., Host Identity Protocol: Achieving IPv4-IPv6 handovers without tunneling, Nov. 2003, in: Proceedings of the Evolute workshop 2003: "Beyond 3G Evolution of Systems and Services", pp. 1-5.*

Henderson et al., Experience with the Host Identity Protocol for secure host mobility and multihoming, Mar. 2003, in: Proceedings of the IEEE Wireless Communications and Networking Conference (WCNC'03), pp. 1-6.*

Ward D, Nikander P: "Host Identity Protocol BOF 58" IETF Meeting Online, Nov. 10, 2003, pp. 1-29.*

Moskowitz et al., Host Identiy Protocol, Oct. 23, 2003, Network Working Group, version 08.*

* cited by examiner

Logical new packet structure

Actual packet structure after the HIP negotiation

FIG. 9

|  | bits | | | | | | | |
|---|---|---|---|---|---|---|---|---|
| Octets | | 8 | 7 | 6 | 5 | 4 | 3 | 2 | 1 |
| | 1 | Type = 128 (decimal) ||||||||
| | 2-3 | Length = 18 (decimal) ||||||||
| | 4 | Spare 1 1 1 1 |||| PDP Type Organization = 1(decimal) ||||
| | 5 | PDP Type Number = HEX(57) ||||||||
| | 6-21 | HIT$_{MS(GGSN)}$ (128 bits) ||||||||

FIG. 10

|  | bits | | | | | | | |
|---|---|---|---|---|---|---|---|---|
| Octets | | 8 | 7 | 6 | 5 | 4 | 3 | 2 | 1 |
| | 1 | Type = 128 (decimal) ||||||||
| | 2-3 | Length = 6 (decimal) ||||||||
| | 4 | Spare 1 1 1 1 |||| PDP Type Organization = 1(decimal) ||||
| | 5 | PDP Type Number = HEX(21) ||||||||
| | 6-9 | LSI$_{MS(GGSN)}$ (32 bits) ||||||||

FIG. 11

| | HIP header | | IP header | |
|---|---|---|---|---|
| Step T3 message headers: | N/A | N/A | source: $HIT_{MS(GGSN)}$ | destination: $HIT_{HH}$ |

| | HIP header | | IP header | |
|---|---|---|---|---|
| Step T4 (I1) message headers: | initiator: $HIT_{MS(GGSN)}$ | responder: $HIT_{HH}$ | source: $IP_{GGSN}$ | destination: $IP_{HH}$ |

| | HIP header | | IP header | |
|---|---|---|---|---|
| Step T4 (R1) message headers: | initiator: $HIT_{MS(GGSN)}$ | responder: $HIT_{HH}$ | source: $IP_{HH}$ | destination: $IP_{GGSN}$ |

IDENTIFICATION METHOD AND APPARATUS FOR ESTABLISHING HOST IDENTITY PROTOCOL (HIP) CONNECTIONS BETWEEN LEGACY AND HIP NODES

BACKGROUND

1. Field

The present invention relates to a method of using the Host Identity Protocol (HIP) to at least partially secure communications between two hosts operating in two different respective network environments, at least one of the two hosts being HIP-enabled.

2. Description of Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

The increasing number of involved parties, and the monetary transactions that were needed for certain services, also created a need for added application level security. Currently, the most widely used encryption protocols, for example SSL/TLS, are running within the upper network layers, for example TCP.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", Internet Draft, work in progress, draft-ietf-mobileip-ipv6-24.txt, IETF, 2003) have been introduced. Together these specifications are planned to provide mobility support for the next generation Internet. Security work is developing in the form of IPsec, and related activities, such as various key exchange protocols, with the aim being to provide security in the IP layer. However, experience has shown that it is fairly hard to reach combined security and mobility using the current standards.

SUMMARY

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network. Clearly, it is impossible to achieve both stability and dynamic changes at the same time.

In the case of Mobile IP, the solution is to use a fixed home location providing a "home address" for the node. The home address both identifies the node and provides a stable location for it when it is at home. The current location information is available in the form of a care-of address, which is used for routing purposes when the node is away from home.

Another solution to the problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-moskowitz-hip-09.txt, IETF, 2004). HIP separates the location and identity roles of IP addresses by introducing a new name-space, the Host Identity (HI). In HIP, the Host Identity is basically a public cryptographic key of a public-private key-pair. The public key identifies the party that holds the only copy of the private key. A host possessing the private key of the key-pair can directly prove that it "owns" the public key that is used to identify it in the network. The separation also provides a means to handle mobility and multi-homing in a secure way.

HIP is discussed in more detail below, but is not the only proposal based around the idea of location and identity separation. FARA (D. Clark, R. Braden, A. Falk, V. Pingali, "FARA: Reorganizing the Addressing Architecture", ACM SIGCOMM 2003 Workshops, Aug. 25 & 27, 2003) is a generalized model of ideas that provides a framework from which the actual architecture can be derived. FARA could make use of the HIP when the node identifications are verified, and consequently HIP could be a part of a particular FARA instantiation. The PeerNet proposal (J. Eriksson, M. Faloutsos, S. Krishnamurthy, "PeerNet: Pushing Peer-to-Peer Down the Stack", IPTPS '03, Feb. 20-21, 2003) also discusses the location and identity separation. The Internet Indirection Infrastructure, $I^3$ (I. Stoica, et. al., "Internet Indirection Infrastructure", ACM SIGCOMM '02, Aug. 19-23, 2002) also defines a separation between the identity and routing information.

The Host Identity Protocol introduces a separation between the location and identity information at the IP layer. In addition to the separation, a protocol is defined to negotiate security associations (SAs) between HIP-enabled nodes.

With HIP, each host has one or more identities, which can be long-term or short-term, that can be used to identify it in the network. With HIP, an identifier is the public key of a public-private key pair. When the host possesses the private key, it can prove that it actually "owns" this identity that the public key represents; this is akin to showing an ID-card.

Each host can generate short-term keys to be used only for a short time. These are useful when it is not necessary for the node to be identified with the same identity later. For example, buying books from a bookstore may be a long-term relationship, while contacting a server once to collect user profiles may be considered to be a short-term action. In the latter case a short-term identity can be created to avoid more widespread dissemination of the long-term identity.

The HIP Host Identity (HI), being a public key, can be quite long and is therefore not practical in all situations. In HIP, the HI is represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

Another representation of the Host Identities is the Local Scope Identifier (LSI), which is a 32-bit representation for the Host Identity. The purpose of the LSI is to facilitate using Host Identities in existing protocols and APIs. For example, since the LSI is the same length as an IPv4 address, it can be used for IPv4 applications directly. Although much of the remainder of this description will be based around the use of the longer HIT, it will be appreciated that the same or similar considerations apply to the alternative LSI representation.

When HIP is used, the upper layers, including the applications, no longer see the IP address. Instead, they see the HIT as the "address" of the destination host. The location information is hidden at a new layer, to be described below. The IP addresses no longer identify the nodes; they are only used for routing the packets in the network.

Applications are not typically interested in location information but do need to know the identity of their peers. The identity is represented by the HIT. This means that the IP address only has importance on lower layers where routing is concerned. The HITs, which the applications use, must be mapped to the corresponding IP addresses before any packets leave the host. This is achieved in a new Host Identity Layer as described below.

FIG. 1 of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

The mapping between a peer HIT and IP address can be retrieved in several ways, one of which being from a DNS server. The location information can be updated by the peer node any time. The update procedure will be discussed in more detail in the mobility management subsection.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes.

FIG. 2 of the accompanying drawings illustrates the operation of the four-way handshake. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against DoS attacks. The R1 initiates also the Diffie-Hellman procedure, containing the public key of the Responder together with the Diffie-Hellman parameters.

Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs between the hosts are bound to the Host Identities, represented by the HITs. However, the packets travelling in the network do not contain the actual HI information, but the arriving packet is identified and mapped to the correct SA using the Security Parameter Index (SPI) value in the IPsec header. FIG. 3 of the accompanying drawings shows the logical and actual packet structures when it travels in the network.

From the above it is clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HIT is verified from the IPsec SADB. If an SA matching to the destination HIT is found, the packet is encrypted using the session key associated with the SA.

The HIT cannot be used to route the packet. Thus, the destination (and source) addresses must be changed to match the IP addresses of the nodes. These mappings are stored, as mentioned earlier, in the HI layer. After the addresses have been changed, the packet can be sent to the network where it is routed to the destination using the IP address information.

At the receiving host, the SPI value is used to find the correct SA form the IPsec SADB. If an entry is found, the IP addresses can be changed to corresponding HITs and the packet can be decrypted using the session key.

Mobility is defined to be the situation where a host moves while keeping its communication context active, or in other words the host changes its topological location, described by the IP address, while still maintaining all existing connections active. The processes running on the host do not see the mobility, except possibly if the experienced quality of service changes.

The mobile host can change the location inside one access network, between different access technologies, or even between different IP address realms, for example between the IPv4 and IPv6 networks. In HIP, the application doesn't notice the change in the IP address version. The HI layer hides the change completely from upper layers. Of course, the peer node must be able to handle the location update that changes the IP version and packets must be routable using some compatible address. If a node does not have both IPv4 and IPv6 connectivity, it may use a proxy node that performs the address version conversion and provides connectivity on behalf of the node.

Multi-homing refers to a situation where an end-point has several parallel communication paths that it can use. Usually multi-homing is a result of either the host having several network interfaces (end-host multi-homing) or due to a network between the host and the rest of the network having redundant paths (site multi-homing).

With HIP, the separation between the location and identity information makes it clear that the packet identification and routing can be cleanly separated from each other. The host receiving a packet identifies the sender by first getting the correct key and then decrypting the packet. Thus, the IP addresses that are in the packet are irrelevant.

A HIP Mobile Node (HMN), moving in the network, may change the point of attachment to the Internet constantly. When the connection point is changed, so does the IP address. This changed location information must be sent to the peer nodes, i.e. HIP Correspondent Nodes (HCN), and this is illustrated in FIG. 4 of the accompanying drawings. The same address can also be sent to a Forwarding Agent (FA) of the HMN, so that the HMN can be reached also via a more stable point. The DNS system is too slow to be used for constantly changing location information. Therefore, there must be a more stable address that can be used to contact the HMN. This address is the address provided by the FA.

The HIP Mobility and Multi-homing protocol (P. Nikander, J. Arkko, P. Jokela, "End-Host Mobility and Multihoming with Host Identity Protocol", Internet Draft, work in progress, draft-nikander-hip-mm-00.txt, IETF, 2003) defines a readdress (REA) packet that contains the current IP address of the HMN. When the HMN changes location and IP address, it generates a REA packet, signs the packet with the private key matching to the used HI, and sends the packet to the peer node and to the FA.

When the peer node receives a REA packet, it must start an address verification process for the IP address that is included in the REA packet. The address verification is needed to avoid accepting false updates from the HMN. It sends an Address Check (AC) packet to the address that was in the REA packet. When the HMN receives an AC that matches to the REA sent earlier, it responds with an Address Check Reply (ACR) packet. After the peer node has received the ACR packet, the address verification is completed and it can add the IP address as the location information of the HMN.

Because the HMN can move between networks using different IP address versions, the address received by the HCN may also be from a different address family than the previous address.

The HCN may support only one IP address version. In this case, the HCN must use some other proxy node that can be used for routing packets over to the other IP address version network.

A multi-homed HIP host, having multiple IP addresses configured on different interfaces connected to different access networks, has much more possibilities to handle the traffic towards a peer node. As it has multiple IP addresses presenting its current location in the network, it may want to tell all of these addresses to its peer nodes. To do so, the multi-homed HIP node creates a REA packet that contains all the addresses that it is able to use towards that particular node. This set of addresses may contain all addresses it has, or some subset of these addresses. When the peer node receives the REA packet with the multiple addresses, it must make address verification for each of these addresses to avoid possible false updates.

The HCN sends a set of AC packets destined to IP addresses included in the REA packet. When the HMN receives these ACs, it responds to each of these with ACRs. The HCN can determine from the received ACR packets, which of the addresses were valid.

False, or non-routable, addresses in the REA packet may be caused either because the HMN is a malicious node, it has an error in the stack implementation, or the HMN may be inside a network that uses private addresses that are not routable in the Internet.

A multi-homed HIP node is able to use all of the available connections, but efficient usage of the connections requires a policy system that has knowledge of the underlying access networks and can control the usage of them. Such a policy system can use different kinds of information: user preferences, operator preferences, input from the network connections, such as QoS, and so on.

In order to start the HIP exchange with a mobile node, the initiator node needs to know how to reach the mobile node. Although Dynamic DNS could be used for this function for infrequently moving nodes, an alternative to using DNS in this fashion is to use the piece of static infrastructure introduced above, the Forwarding Agent (also referred to as a HIP rendezvous server). Instead of registering its current dynamic address with the DNS server, the mobile node registers the address(es) of its Forwarding Agent(s). The mobile node keeps the Forwarding Agent(s) continuously updated with its current IP address(es). A Forwarding Agent simply forwards the initial HIP packet from an initiator to the mobile node at its current location. All further packets flow between the initiator and the mobile node. There is typically very little activity on a Forwarding Agent, mainly address updates and initial HIP packet forwarding. Thus, one Forwarding Agent can support a large number of potential mobile nodes. The mobile nodes must trust the Forwarding Agent to properly maintain their HIT and IP address mappings. A Forwarding Agent can be used even for nodes that are fixed in location, since it is often the case that fixed nodes can change their IP address frequently, for example when it is allocated each time an Internet connection is set up by a Service Provider for that node.

The Forwarding Agent is also needed if both of the nodes are mobile and happen to move at the same time. In that case, the HIP readdress packets will cross each other in the network and never reach the peer node. To solve this situation, the nodes should remember the Forwarding Agent address, and re-send the HIP readdress packet to the Forwarding Agent if no reply is received. The mobile node keeps its address current on the Forwarding Agent by setting up a HIP association with the Forwarding Agent and sending HIP readdress packets to it. A Forwarding Agent will permit two mobile systems to use HIP without any extraneous infrastructure (in addition to the Forwarding Agent itself), including DNS if they have a method other than a DNS query to get each other's HI and HIT.

In the case of legacy equipment, a host may not be HIP-enabled, and the only option is to identify connections between hosts using IP addresses. This is not secure. The situation may be improved by locating a HIP proxy between the HIP-enabled host and the host which cannot use HIP. A typical scenario would be a small corporate LAN where the client terminals are not HIP-enabled. Traffic is routed to correspondent hosts (which are HIP-enabled) via the HIP proxy.

This arrangement is illustrated in FIG. 5 of the accompanying drawings. In FIG. 5, a legacy host 12 is shown communicating with a HIP-enabled node 14 (having the domain name "hip.foo.com") via a HIP proxy 16. The legacy host 12 accesses the HIP proxy 16 over an access network 18 while the HIP proxy 16 accesses the HIP node 14 over the Internet 20. To partially secure the connection between the legacy host 12 and the HIP node 14, all communications between the HIP proxy 16 and the HIP node 14 are through a Security Association set up between the HIP proxy 16 and the HIP node 14 in a similar way to that described above with reference to FIG. 3.

However, even before the Security Association 22 shown in FIG. 5 can be set up to enable communication between the legacy host 12 and the HIP node 14, a problem arises when the legacy host 12 tries to resolve the IP address of the HIP node 14 by sending a query to a DNS server 24-1 (and in turn DNS server 24-2) when the HIP node 14 is located behind a Forwarding Agent 26 as described above. The DNS server 24-1 will return the HIT of the HIP node 14 together with the IP address of the Forwarding Agent 26. As the legacy host 12 is not HIP enabled, it will disregard the HIT and start sending messages to the Forwarding Agent 26. Without the HIT, the Forwarding Agent 26 will not be able to resolve the destination address of these messages since it is most likely that several HIP nodes will use the same Forwarding Agent 26. Likewise, since the legacy host 12 discards the HIT and uses only the IP address of the HIP node 14 when initiating a connection, the HIP proxy 16 is unable to initiate HIP negotiation between itself and the HIP node 14 because it does not know the HIT of the HIP node 14. This problem is addressed in our co-pending PCT Application No. PCT/EP04/050129.

Other technical considerations arise when implementing HIP in third generation (3G) mobile telecommunications networks where not all of the User Equipments (UEs) in the 3G environment are HIP enabled. In this context, the Universal Mobile Telecommunications System (UMTS) is the 3G successor to the Global System for Mobile Communications (GSM). The most important evolutionary step of GSM towards UMTS is the General Packet Radio Service (GPRS). GPRS introduces packet switching into the GSM core network and allows direct access to packet data networks (PDNs). This enables high-data rate packet switched transmission well beyond the 64 kbps limit of ISDN through the GSM core network, which is a necessity for UMTS data transmission rates of up to 2 Mbps. GPRS is a prerequisite for the UMTS introduction.

It is desirable to provide the benefits of the Host Identity Protocol described above for communications between a host operating within one network environment, such as UMTS or GPRS, and a HIP enabled host operating within another network environment, such as the Internet.

According to a first aspect of the present invention there is provided a method of using the Host Identity Protocol (HIP) to at least partially secure communications between a first host operating in a first network environment and a second, HIP-enabled, host operating in a second network environment, with a gateway node forming a gateway between the two environments, the method comprising: associating an identifier with the first host, storing the identifier at the gateway node, and sending the identifier to the first host; using the identifier as a source address in a subsequent session initiation message sent from the first host to the gateway node and having an indication that the destination of the message is the second host; and using the stored identifier at the gateway node to negotiate a secure HIP connection to the second host. The identifier may be generated at the gateway node. The identifier may be generated in response to the sending of a context activation request from the first host to the gateway node. The context activation request may be a Packet Data Protocol (PDP) context activation request to activate a PDP context, and the identifier is used as the PDP address in the PDP context.

The first host may not be HIP enabled, in which case the secure HIP connection is negotiated between the gateway node and the second host.

Alternatively, the first host may be HIP enabled, in which case the secure HIP connection is negotiated between the first and second hosts.

The identifier may be of the same length as an address in the addressing scheme used by the first host for communication with the gateway node. For example, the IP addressing scheme may be used such that the identifier may be used as the source IP address in the session initiation message.

The identifier may be a look-up identifier associated with a HIP identity tag generated for and associated with the first host, allowing the HIP identity tag for the first host to be retrieved at the gateway node using the look-up identifier.

Alternatively, the identifier may itself be a HIP identity tag.

The HIP identity tag may be included in a HIP header during negotiation of the HIP connection between the gateway and the second host.

The HIP identity tag may be a Host Identity Tag (HIT) or a Local Scope Identifier (LSI). The HIP identity tag may be generated from a key pair. The key pair which may be stored in the gateway node for use during subsequent HIP communications between the gateway node and the second host.

The identifier may be in the form of an IP address.

The first network environment may be a mobile network environment. The mobile network environment may be a 3G mobile environment, such as a UMTS mobile network environment. The second network environment may be an Internet network environment.

The gateway node may provide the functionality of a HIP proxy. The gateway node may be a Gateway GPRS Support Node (GGSN).

The method may comprise replacing the identifier with an address associated with the gateway node as the source address in a subsequent message sent to the second host.

According to a second aspect of the present invention there is provided a communications system comprising a first host operating in a first network environment, a second, Host Identity Protocol (HIP) enabled, host operating in a second network environment, a gateway node forming a gateway between the two environments, means for associating an identifier with the first host, means for storing the identifier at the gateway node, means for sending the identifier to the first host, means for using the identifier as a source address in a subsequent session initiation message sent from the first host to the gateway node and having an indication that the destination of the message is the second host, and means for using the stored identifier at the gateway node to negotiate a secure HIP connection to the second host.

According to a third aspect of the present invention there is provided a method, for use by a gateway node, of using the Host Identity Protocol (HIP) to at least partially secure communications between a first host operating in a first network environment and a second, HIP-enabled, host operating in a second network environment, with the gateway node forming a gateway between the two environments, the method comprising: associating an identifier with the first host, storing the identifier at the gateway node, and sending the identifier to the first host; receiving a subsequent session initiation message sent from the first host to the gateway node, the message having the identifier as a source address and also having an indication that the destination of the message is the second host; and using the stored identifier at the gateway node to negotiate a secure HIP connection to the second host.

According to a fourth aspect of the present invention there is provided an apparatus for use as a gateway node between a first host operating in a first network environment and a second, Host Identity Protocol (HIP) enabled, host operating in a second network environment, comprising: means for associating an identifier with the first host, means for storing the identifier at the gateway node, means for sending the identifier to the first host, means for receiving a subsequent session initiation message sent from the first host to the gateway node, the message having the identifier as a source address and also having an indication that the destination of the message is the second host, and means for using the stored identifier at the gateway node to negotiate a secure HIP connection to the second host.

According to a fifth aspect of the present invention there is provided an operating program which, when run on a gateway node, causes the gateway node to carry out a method according to the third aspect of the present invention.

According to a sixth aspect of the present invention there is provided an operating program which, when loaded into a gateway node, causes the gateway node to become apparatus according to the fourth aspect of the present invention.

The operating program may be carried on a carrier medium. The carrier medium may be a transmission medium or a storage medium, for example.

BRIEF DESCRIPTION OF THE DRAWINGS

FIG. 9 illustrates the End User Address information in an embodiment of the present invention using a 128-bit representation for the identifier;

FIG. 10 illustrates the End User Address information in an embodiment of the present invention using a 32-bit representation for the identifier;

FIG. 11 illustrates the contents of the HIP and IP headers for certain messages sent in the first embodiment;

DETAILED DESCRIPTION

Embodiments of the present invention will be described within the framework of the GPRS/UMTS network architecture shown in FIG. 6. The principles underlying an embodiment of the present invention are equally applicable to UMTS as they are to GPRS.

As mentioned above, GPRS has been designed as an extension to the existing GSM network infrastructure, with the aim of providing a connectionless packet data service. GPRS introduces a number of new functional elements over GSM that support the end-to-end transport of IP-based packet data, as will be described below.

Figure 6:
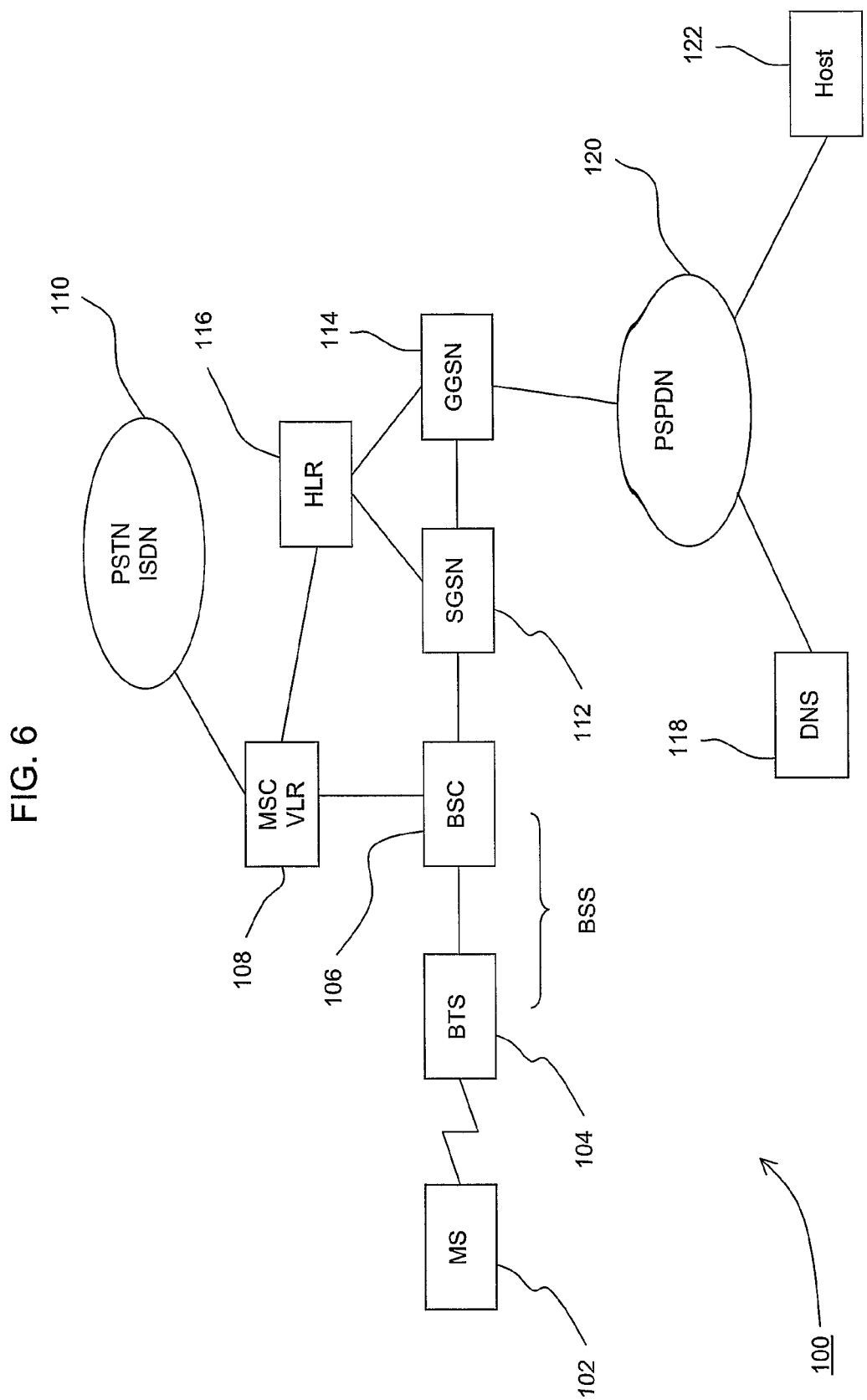
FIG. 6 is a block diagram showing elements of a GPRS/UMTS network architecture to which embodiments of the present invention are applied.

The communications system 100 shown in FIG. 6 comprises a mobile station (MS) 102 in communication with a Base Transceiver Station (BTS) 104 which in turn communicates with a Base Station Controller (BSC) 106. The BTS 104 and BSC 106 together make up the Base Station Subsystem (BSS). At the BSC 106, a Packet Control Unit (PCU, not shown) differentiates circuit switched data destined for a telephony network 110 from packet switched data destined for a packet data network 120. The telephony network 110 can be, for example, a Public Switched Telephone Network (PSTN) or Integrated Services Digital Network (ISDN), while the packet data network can be, for example, a Packet Switched Public Data Network, the Internet, or a corporate LAN.

Circuit switched data is routed to the telephony network 110 via a Mobile Switching Centre (MSC) incorporating Visitor Location Register (VLR). On the other hand, packet switched data is routed to the packet data network 120 via a Serving GPRS Support Node (SGSN) 112 and a Gateway GPRS Support Node (GGSN) 114. The MSC 108, SGSN 112 and GGSN 114 have access to a Home Location Register (HLR) 116 which is a database containing subscriber information, for example services, account status information, preferences and IP addresses associated with subscribers. In FIG. 6, a Domain Name System (DNS) server 118 is shown as accessible through the packet data network 120. Also shown is a host 122 connected to the packet data network 120.

Two major new core network elements are introduced with GPRS over the standard GSM network: the SGSN 112 and the GGSN 114. The SGSN 112 monitors the state of the mobile station 102 and tracks its movements within a given geographical area. It is also responsible for establishing and managing the data connections between the mobile user and the destination network. If the user moves into a segment of the network that is managed by a different SGSN it will perform a handoff to the new SGSN.

The GGSN 114 provides the point of attachment between the GPRS network environment and the external packet data network environment 120, such as the Internet and corporate Intranets. Each external network 120 is given a unique Access Point Name (APN) which is used by the mobile user to establish the connection to the required destination network. Further information can be found from the Technical Specifications for GPRS and UMTS which are available from http://www.3gpp.org.

Before the mobile station 102 is able to use GPRS services, it must register with the SGSN 112 of the GPRS network using the GPRS attach procedure. During the attach procedure, the network checks if the user is authorised, copies the user profile from the HLR 116 to the SGSN 112, and assigns a packet temporary mobile subscriber identity (P-TMSI) to the user. Where the mobile station 102 was already connected to a SGSN 112, an update location message is sent to the appropriate HLR 116 which performs a location updating process in view of the new SGSN 112. More detailed information concerning the GPRS Attach procedure can be found in section 6.5 of the GPRS Technical Specification 3GPP TS 23.060 V6.3.0 (2003-12). The disconnection from the GPRS network is called GPRS detach. It can be initiated by the mobile station or by the network (SGSN 112 or HLR 116).

Upon completing the Attach procedure, the network is able to track the MS 102 (via subsequent location updates) and is aware of the services and networks that the user has access to. However, at this point, the user is not able to send or receive data to or from the packet data network 120. To exchange data packets with the packet data network 120 after a successful GPRS attach, a Packet Data Protocol (PDP) context must first be activated.

In a prior art GPRS system, without the HIP protocol, to exchange data packets with an external packet data network after a successful GPRS attach, a mobile station must apply for one or more addresses in the packet data network, for example for an IP address in the case where the packet data network is an IP network. This address is called the PDP address. For each session, a PDP context is created, which describes the characteristics of the session. It contains the PDP type (for example, IPv4), the PDP address assigned to the mobile station, the requested quality of service (QoS), and the address of a GGSN 114 that serves as the access point to the packet data network. This context is stored in the mobile station 102, the SGSN 112, and the GGSN 114. With an active PDP context, the mobile station 102 is "visible" to the external packet data network 120 and is able to send and receive data packets. The mapping between the two addresses, PDP and IMSI (International Mobile System Identifier), enables the GGSN 114 to transfer data packets between the packet data network 120 and the mobile station 102.

Figure 7:
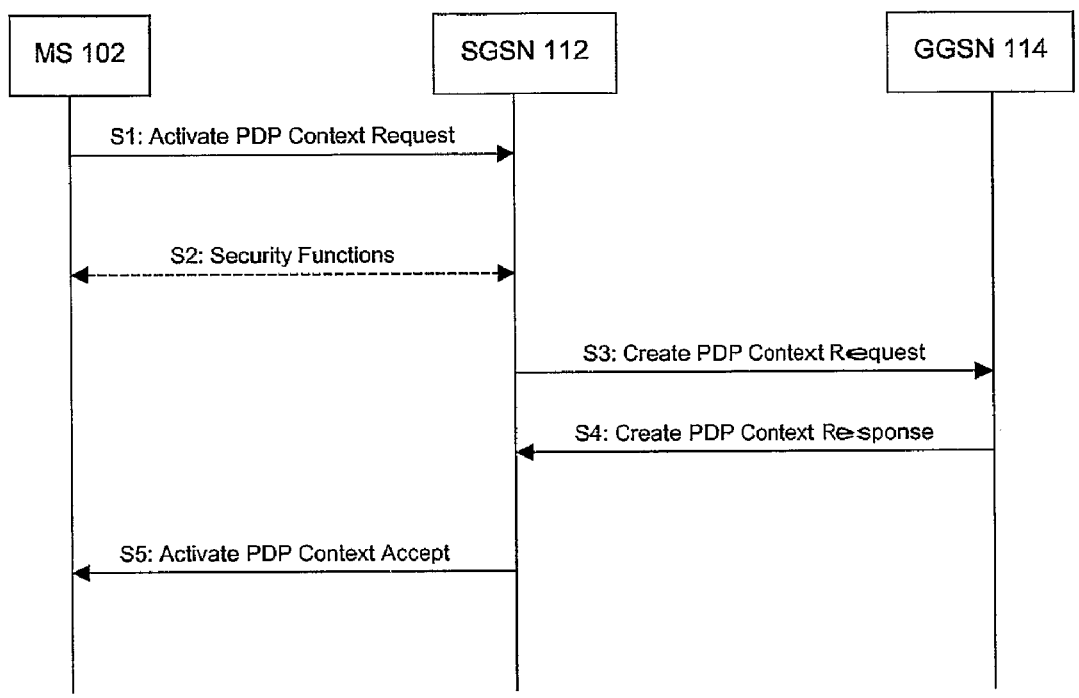
FIG. 7 is a signal diagram showing an example of a PDP context activation procedure.

FIG. 7 shows an example of such a PDP context activation procedure. In step S1, an Activate PDP Context Request is sent from the MS 102 to the SGSN 112. In step S2, the usual security functions (for example, authentication of the user) are performed. If access is granted, the SGSN 112 will send a Create PDP Context Request message to the affected GGSN 114 (step S3). The GGSN 114 creates a new entry in its PDP context table, which enables the GGSN 114 to route data packets between the SGSN 112 and the external packet data network 120. The GGSN 114 then returns, in step S4, a Create PDP Context Response to the SGSN 112 which contains the PDP address assigned, for example an IPv4 address. The SGSN 112 updates its PDP context table and confirms the activation of the new PDP context to the MS 102 with an Activate PDP Context Accept message in step S5. The GPRS PDP Context Activation procedure is described in more detail in section 9.2.2 of the above-mentioned GPRS Technical Specification, and the message exchanges described above (called "Tunnel Management Messages") are described in further detail in section 7.3 of the UMTS/GPRS Technical Specification ETSI TS 129.060 V5.8.0 (2003-12).

In the present embodiment of the present invention, the above-described PDP Context Activation procedure still applies but is modified to enable communications between the mobile station 102 in the GPRS network environment and the host 122 in the packet data network environment 120 to be at least partially secured using HIP. As described above, to provide HIP support for nodes inside a network, a HIP proxy is required to at least partially provide the advantages of HIP for legacy terminals operating within the network environment. In the context of the GPRS network environment, in the present embodiment the HIP proxy is provided as part of the GGSN 114. Therefore, in the present embodiment the GGSN 114 of FIG. 6 is a GGSN HIP proxy 114.

The present embodiment will now be described in more detail with reference to FIG. 8, in which the host 122 of FIG. 6 is a HIP-enabled host 122 and the mobile station 102 is a legacy (non-HIP-enabled) mobile station 102.

Figure 8:
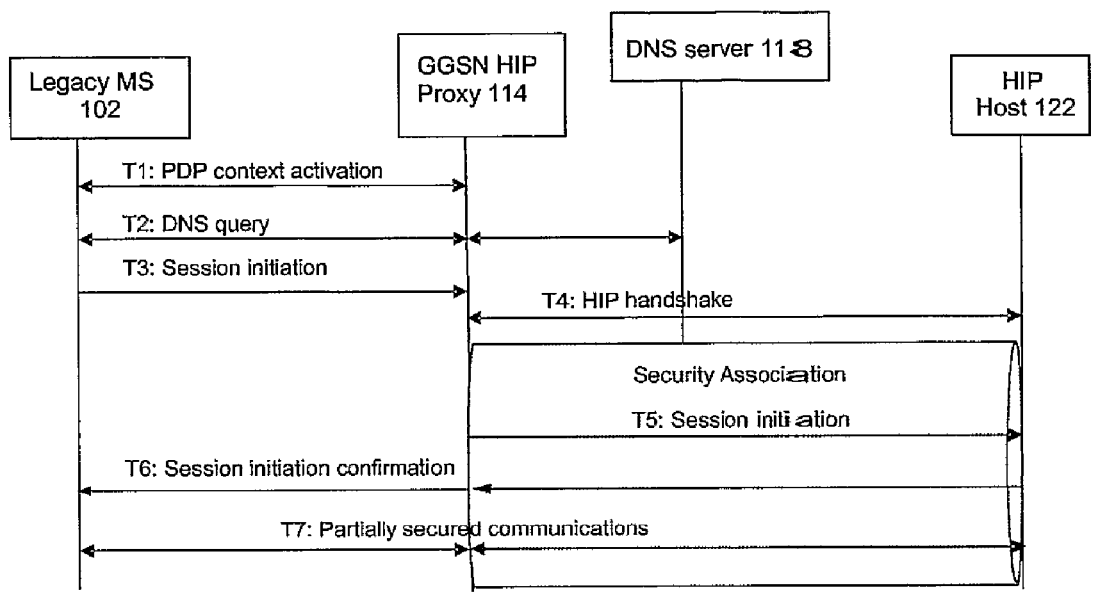
FIG. 8 is a signal diagram illustrating a method according to a first embodiment of the present invention.

FIG. 8 is a signal diagram illustrating a method embodying the present invention of using the Host Identity Protocol to at least partially secure communications between a first host (the legacy MS 102) operating in a first network environment (the GPRS network environment) and a second host (the HIP host 122) operating in a second network environment (the packet data switched network environment). The GGSN HIP proxy 114 forms a gateway between the two network environments.

In step T1, the legacy MS 102 initiates a PDP context activation procedure. In the PDP context activation procedure according to this embodiment of the present invention, the GGSN HIP proxy 114 generates a key-pair (HI and secret key) and associates it with the legacy MS 102, storing the key-pair in the GGSN HIP proxy 114. Based on the public key (HI), an identifier is generated and associated with the legacy MS 102, and then sent to the legacy MS 102 as the address to be used in the PDP context. This differs from a conventional PDP Context Activation procedure described above where an IP address is usually returned to the mobile station 102 as the PDP address.

Where IPv6 is being used at the legacy MS 102, the identifier associated with the legacy MS 102 is a Host Identifier Tag (HIT) described above, which is of the same length as an IPv6 address, and is referred to here as $HIT_{MS(GCSN)}$. Where IPv4 is being used at the legacy MS 102, the identifier is a Local Scope Identifier (LSI) described above, which is of the same length as an IPv4 address, and is referred to here as $LSI_{MS(GGSN)}$. In the former case (IPv6), the End User Address in the Create PDP Context Response is illustrated in FIG. 9, while in the latter case (IPv4), the End User Address is illustrated in FIG. 10.

The identifier, in whatever form, is received by the legacy MS 102 in the End User Address, and the MS 102 stores the identifier for use as the source address in a subsequent session initiation message to be described below. It is therefore important the length of the identifier is the same as the source address field of the addressing scheme used by the legacy MS 102.

When the legacy MS 102 subsequently wishes to make a connection to the HIP host 122, as indicated by step T2 of FIG. 8, it sends a DNS query to acquire the IP address of the HIP host 122. The DNS query travels via the GGSN HIP proxy 114 to the DNS server 118. The DNS server 118 returns the IP address of the HIP host 122, $IP_{HH}$, as well as the HIT for the HIP host 122, $HIT_{HH}$, and this information is stored at the GGSN HIP proxy 114. $HIT_{HH}$ is then sent to the legacy MS 102, and will be used as a destination indicator in a subsequent session initiation message to be described below. The destination indicator will be inserted into the destination address field of the session initiation message, and therefore it is important that the destination indicator is of the same length as the destination address field of the session initiation message. Therefore, if the legacy MS 102 is only IPv4 capable, the destination indicator that is sent to the legacy MS 102 in response to its DNS query must be of the same length as an IPv4 address. The GGSN HIP proxy 114 must therefore allocate an LSI, or an IPv4 address, or some other 32-bit representation for the HIP host 122, which is unique within the mobile network environment. Address translation is subsequently required at the GGSN HIP proxy 114, which will be readily achievable by the skilled person.

In step T3, a session initiation message is sent from the legacy MS 102 to the GGSN HIP proxy 114, with the source field in the IP header set to the $HIT_{MS(CGSN)}$ identifier and the destination field set to $HIT_{HH}$, as indicated in FIG. 11. In the case of IPv4 addressing, the destination address is set to the LSI of the HIP host 122, $LSI_{HH}$ (or the LSI allocated to the HIP host 122 where IPv6 to IPv4 translation is in operation).

Figure 1:
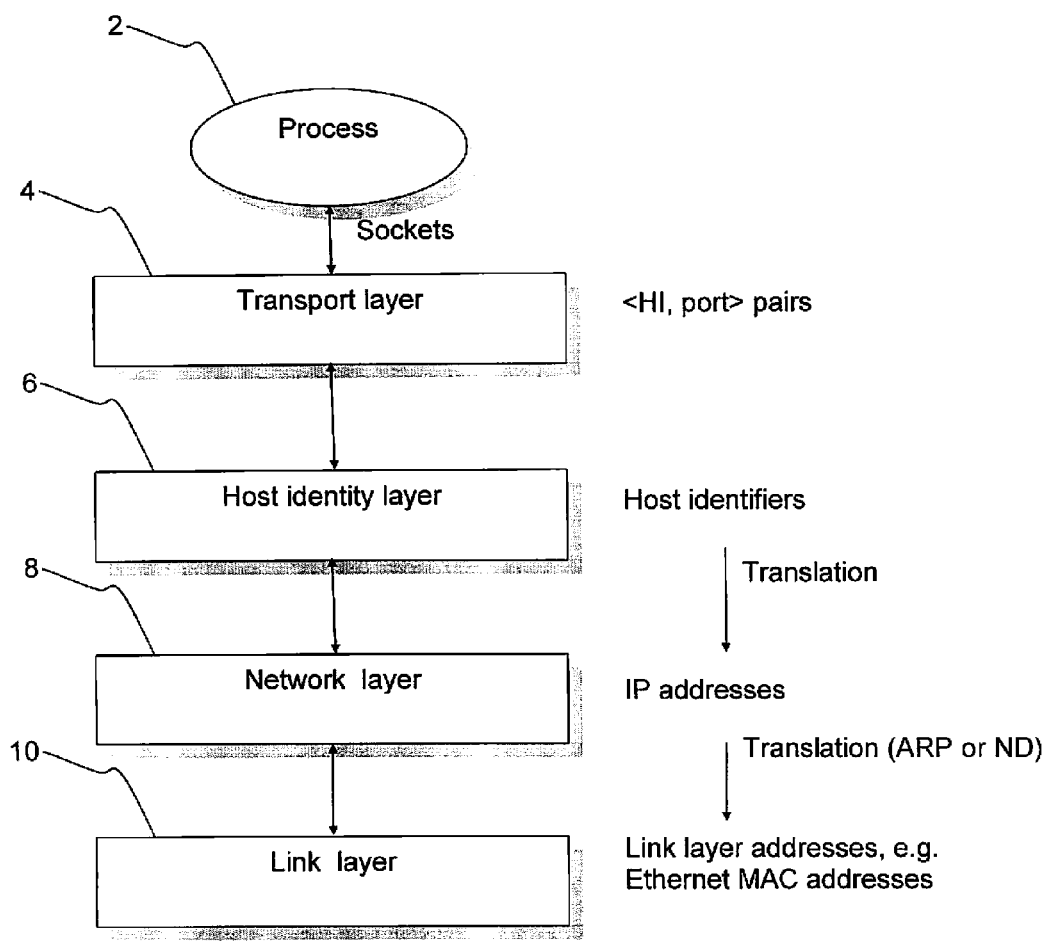
FIG. 1, discussed hereinbefore, illustrates the various layers in the Host Identity Protocol.
Figure 2:
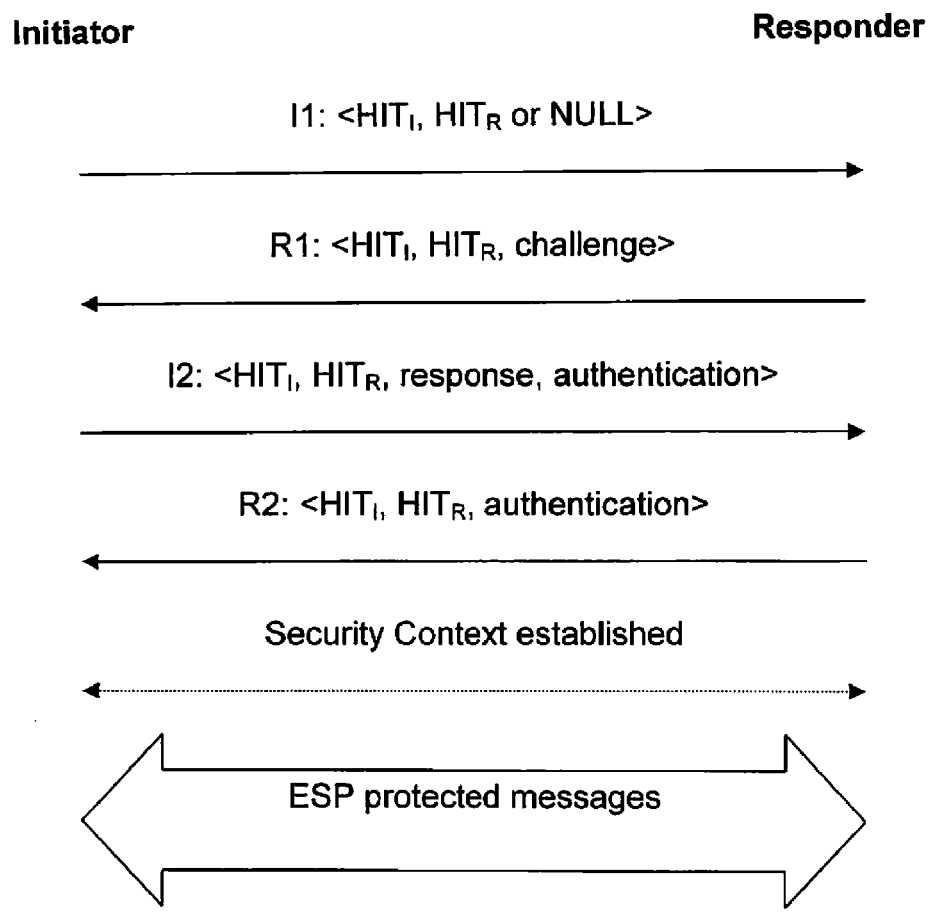
FIG. 2, also discussed hereinbefore, illustrates the operation of the four-way handshake in the HIP protocol.
Figure 3:
FIG. 3, also discussed hereinbefore, shows the logical and actual packet structures in HIP.
Figure 3:
Figure 4:
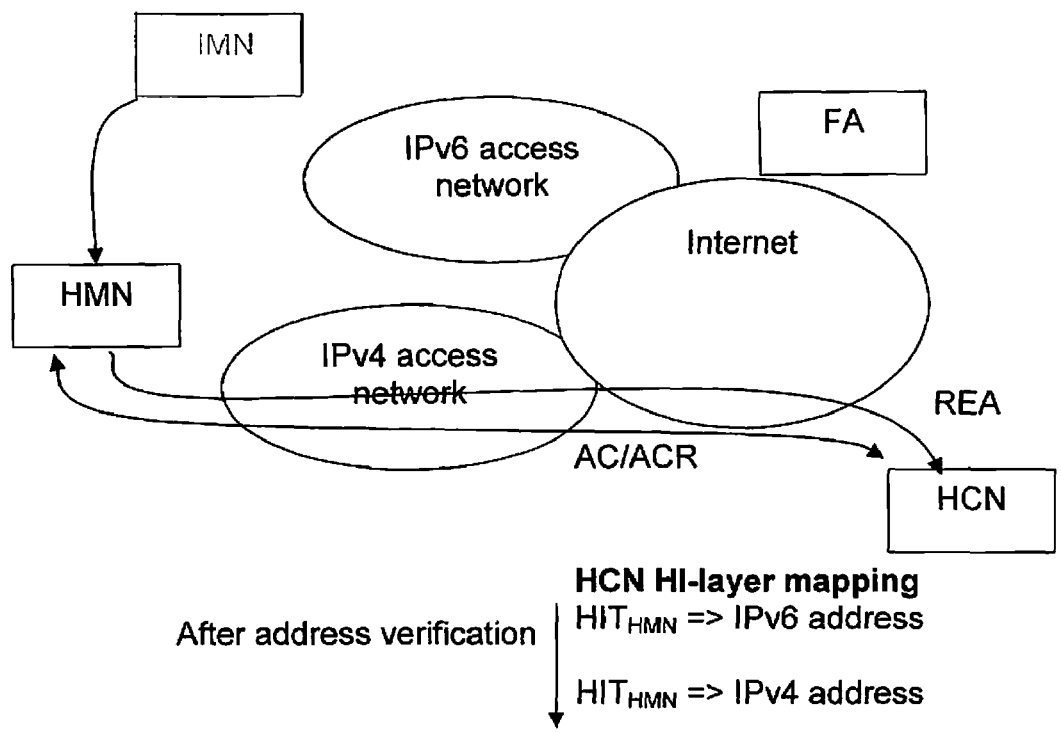
FIG. 4, also discussed hereinbefore, illustrates a handover between IPv6 and IPv4.
Figure 5:
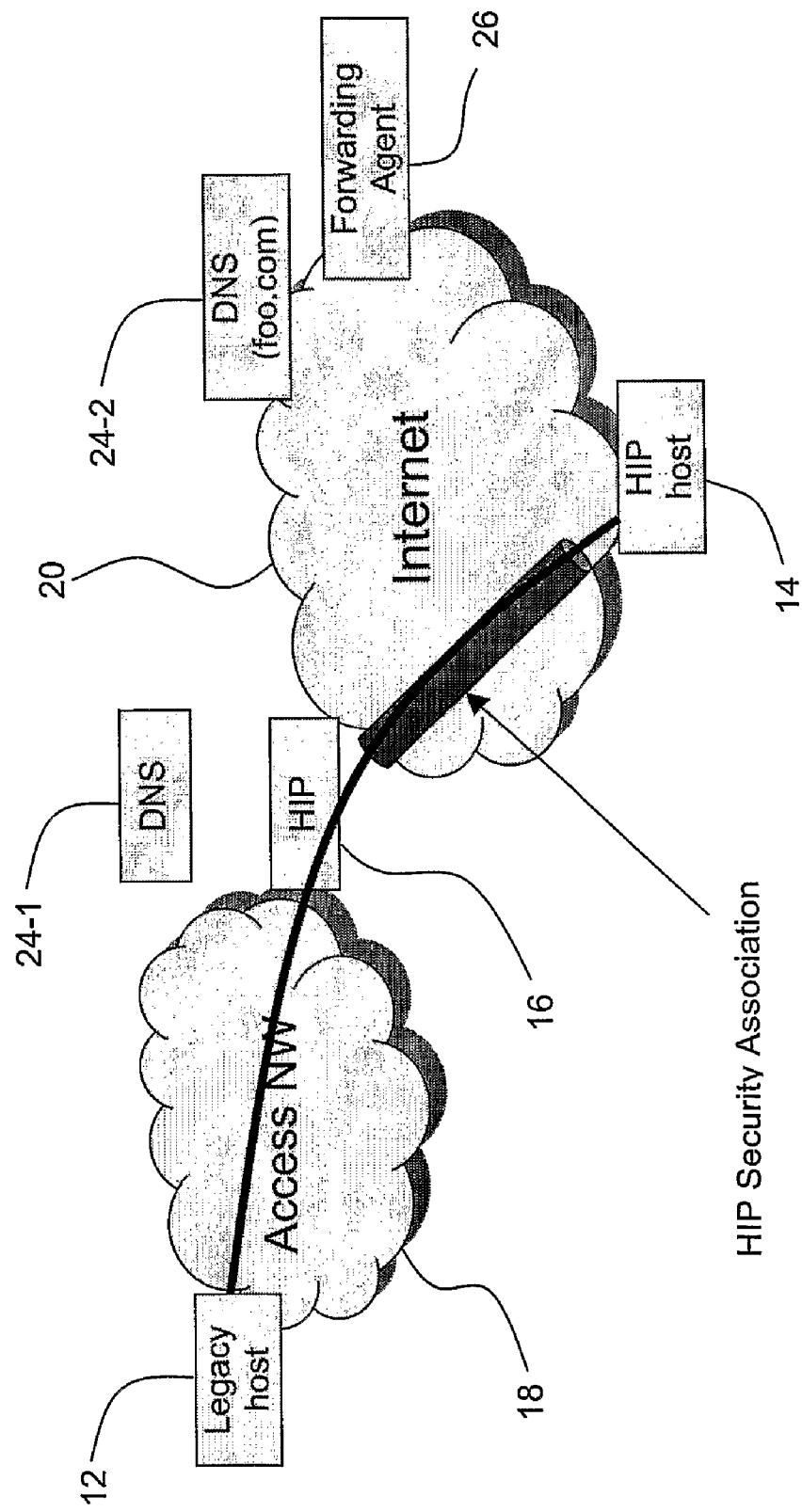
FIG. 5, also discussed hereinbefore, is a schematic diagram illustrating the general network setup for communications between a legacy host and a HIP mode via a HIP proxy.

Upon receipt of the session initiation message, the GGSN HIP proxy 114 notices that it has stored a HIT (or LSI) which matches the received packet's destination HIT (or LSI) following the DNS query described above in step T2. Therefore the GGSN HIP proxy 114 knows that the intended destination node is HIP-enabled and that communications between the legacy MS 102 and the HIP host 122 can be at least partially secured using the Host Identity Protocol. In this example, the GGSN HIP proxy 114 cannot find a Security Association for a connection between it and the HIP host 122, so it subsequently performs the HIP 4-way handshake described above with reference to FIG. 2 to create a Security Association between the GGSN HIP proxy 114 and the HIP host 122. The HIP handshake is shown in FIG. 8 as step T4.

The I1 and R1 packet headers for the 4-way HIP handshake are shown in FIG. 11. In the HIP header for the I1 and R1 packets, the Initiator field is set to $HIT_{MS(GCSN)}$ and the Responder field is set to $HIT_{HH}$. In the IP header, $IP_{CGSN}$ is used in the source field of the I1 packet and the destination field of the R1 packet, while $IP_{HH}$ is used in the destination field of the I1 packet and the source field of the R1 packet.

When the Security Association has been set up between the GGSN HIP proxy 114 and the HIP host 122, in step T5 the GGSN HIP proxy 114 sends the session initiation message (received from the legacy MS 102 in step T3) to the HIP host 122 using the Security Association. In step T6, a session initiation confirmation is returned to the legacy MS 102.

Subsequent communications between the legacy MS 102 and the HIP host 122 can now continue, with communications between the GGSN HIP proxy 114 and the HIP host 122 protected with the HIP Security Association. When the GGSN HIP proxy 114 receives a packet from the HIP host 122 it processes it and sends the data as a regular IP packet to the legacy MS 102 based on the packet's destination HIT which is the same as that assigned to the legacy MS 102 in step T1.

As described above, during the HIP negotiation to set up the Security Association between the GGSN HIP proxy 114 and the HIP host 122, and during subsequent communications between the legacy MS 102 and the HIP host 122 via the GGSN HIP proxy 114, the $HIT_{MS(GGSN)}$ and associated key-pair generated for the legacy MS 102 are used, rather than the HIT and key pair of the GGSN HIP proxy 114 itself. This is so that a separate Security Association (or pair of Security Associations) is created for each legacy MS 102 communicating with the HIP host 122. If the HIT and key pair of the GGSN HIP proxy 114 were used, and there were multiple mobile stations communicating with the same HIP host 122, the communication between the GGSN HIP proxy 114 and the HIP host 122 would use the same Security Association and there would not be any information that could be used at the GGSN HIP proxy 114 to separate the connections between different Mobile Stations; all incoming packets from the peer would contain the same destination IP and SPI. However, if there were only one MS talking to a particular HIP host 122, it would be possible to use the HIT and key pair of the GGSN HIP proxy 114.

In the above-described first embodiment, the mobile station 102 is not HIP enabled. A second embodiment of the present invention will now be described in which the mobile station 102 is a HIP-enabled mobile station 102.

Figure 12:
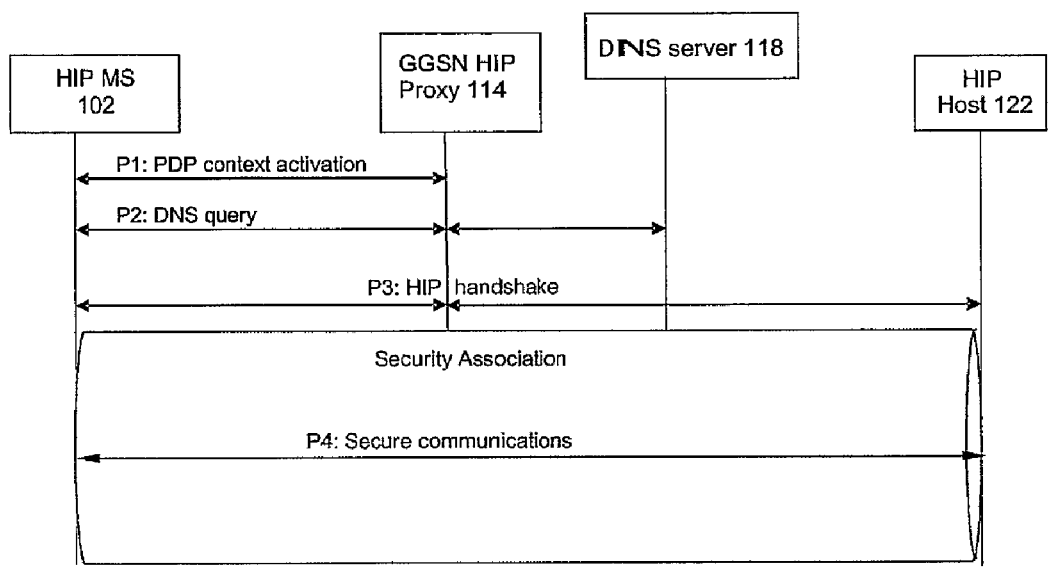
FIG. 12 is a signal diagram illustrating a method according to a second embodiment of the present invention.

FIG. 12 is a signal diagram illustrating the operation of the second embodiment. Steps P1 and P2 are performed in a manner corresponding to respective steps T1 and T2 in the first embodiment, and therefore a further description will not be included here. Following receipt at the HIP MS 102 of the HIT of the HIP host 122, $HIT_{HH}$, the HIP MS 102 realises that the HIP host 122 is HIP capable. Unlike in the first embodiment, since both the MS 102 and the host 122 are HIP capable, in the second embodiment the HIP negotiation can be carried out directly between the MS 102 and the host 122. The GGSN HIP proxy 114 does not take part in the actual HIP negotiation, but instead will gather information about the HITs, IP addresses and SPIs. In step P3, the HIP handshake is initiated by the sending of a I1 packet from the HIP MS 102 to the HIP host 122 via the GGSN HIP proxy 114. In the second embodiment, the I1 packet is considered to be equivalent to the session initiation message of the first embodiment sent from the legacy MS 102 to the GGSN HIP proxy 114 in step T3.

Figure 13:
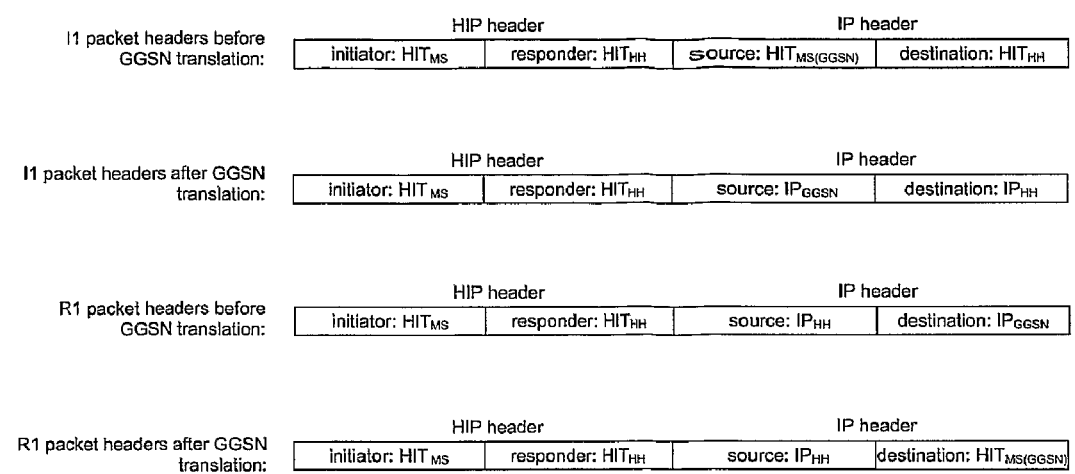
FIG. 13 illustrates the contents of the HIP and IP headers for certain messages sent in the second embodiment.

The HIP and IP headers of the I1 packet sent from the HIP MS 102 are shown at the top of FIG. 13. Throughout the HIP negotiation, the Initiator field of the HIP header is set to the HIT of the HIP MS 102 ($HIT_{MS}$) and not the HIT assigned by the GGSN HIP proxy 114 ($HIT_{MS(GGSN)}$). This is because, in the second embodiment, the HIP capable MS 102 must itself be responsible for the HIP negotiations and Security Associations between itself and HIP host 122. The $HIT_{MS(GGSN)}$ assigned by the GGSN HIP proxy 114 cannot be used in communications between the HIP MS 102 and the HIP host 122 because the MS 102 does not have the corresponding private key and thus cannot sign packets using $HIT_{MS(GGSN)}$.

Throughout the HIP negotiation in step P3, the Responder field of the HIP header is set to the HIT of the HIP host 122 ($HIT_{HH}$).

In the I1 packet received at the GGSN HIP proxy 114, the source field of the IP header is set to the identifier previously assigned by the GGSN HIP proxy 114, $HIT_{MS(GGSN)}$, and the destination field is set to $HIT_{HH}$ notified to the HIP MS 102 following the DNS query in step P2. From the I1 packet, the GGSN HIP proxy 114 can determine from the source field of the IP header (containing the identifier $HIT_{MS(GGSN)}$) which terminal has sent this packet. The GGSN HIP proxy 114 makes appropriate address translations to replace the source IP address to the globally-routable IP address of the GGSN, $IP_{GGSN}$, and replaces the destination HIP address with the IP address of the HIP host 122, $IP_{HH}$. Depending on the destination address, the packet is routed to the HIP host 122 either directly or via a Forwarding Agent of the HIP host 122.

The HIP host 122 responds with an R1 packet having HIP and IP headers as shown in FIG. 13. The headers of the R1 packet are the same as those of the I1 packet received at the HIP host 122, except that the source and destination IP fields are reversed.

When the GGSN HIP proxy 114 receives the R1 packet, it verifies the correct recipient using $HIT_{MS}$ in the HIP header and retrieves the correct destination address, replacing the destination IP address by $HIT_{MS(GGSN)}$, as illustrated at the bottom of FIG. 13.

The I2 packet contains similar header information to the I1 packet. The I2 packet also contains the SPI value selected by the HIP MS 102. The SPI value is stored at the GGSN HIP proxy 114, thus forming a connection entry $\{HIT_{MS(GGSN)}; SPI_{HH\text{->}MS}; HIT_{HH}\}$. This information is required for delivering the incoming data traffic to the correct MS.

From the R2 packet, the GGSN HIP proxy 114 can learn the SPI value that the MS will use towards the HIP host 122, but this information is not needed during the communication. The SPI value must be unique inside the 3G network. Thus, the GGSN HIP proxy 114 could perform SPI translation when the I2/R2 packets go via it. Thus, the end-hosts would have different SPIs that they use. The HIP MS 102 sends the SPI to the HIP host 122 for use in packets from the HIP host 122 towards the HIP MS 102. The GGSN HIP proxy 114 generates a unique SPI that does not overlap with any other SPIs used towards the 3G network and replaces it in the packet. Thus, the GGSN HIP proxy 114 performs SPI mapping when packets flow. In the HIP, this means that the GGSN HIP proxy 114 must be able to change the SPI value in I2 and R2 packets. Currently, the SPI value belongs to area that is signed by the sender, and therefore changing the value would break the signature. One option would be to put the SPI value outside the signature in I2s and R2 packets, and this may be changed in future HIP specifications. The GGSN HIP proxy 114 could allocate an area of SPIs that the HIP MS 102 would use. Thus, the SPI values that a HIP MS 102 could use would be controlled by the GGSN HIP proxy 114 and no overlapping would occur. This would require a field inserted in the context activation procedure that would contain the allowed SPIs that the HIP MS 102 can use.

In the above-described second embodiment, reference is made to the use of HITs rather than LSIs. It will nevertheless be appreciated that these two representations are essentially equivalent, and that the LSI representation can be used where appropriate.

The above description of the PDP context activation procedure for the second embodiment relied on the equivalent procedure described in the first embodiment, in which the GGSN HIP proxy 114 generates a HIT or LSI identifier associated with the MS 102, storing the identifier in the GGSN HIP proxy 114. It will be appreciated that in the second embodiment it is not necessary for the setting up of communications between the MS 102 and the HIP host 122 that the identifier is actually stored at the GGSN HIP proxy 114. For example, referring to FIG. 13, the identifier $HIT_{MS(GGSN)}$ is included as the source IP field of the I1 packet sent to the GGSN HIP proxy 114 and is replaced by $IP_{GGSN}$ for the I1 packet forwarded to the HIP host 122; there is no need to match the $HIT_{MS(GGSN)}$ received in the I1 packet with any identifier stored at the GGSN HIP proxy 114 to perform this replacement operation. Thus the identifier is associated with the first host, sent to the first host and subsequently used as a source address in a session initiation message sent from the first host to the gateway node, with the identifier received at the gateway node in the initiation message being used to negotiate a secure HIP connection to the second host. In the first embodiment the identifier is required to be stored so that the associated key-pair can be retrieved for the subsequent HIP negotiation. However, in both embodiments it is not necessary that the identifier is stored at the GGSN HIP proxy 114 itself, but may be stored in a server or other such store in communication with the GGSN HIP proxy 114. It is also not necessary that the identifier be generated at the GGSN HIP proxy 114 itself, since it may be generated away from the GGSN HIP proxy 114 and retrieved from there.

In both the first and second embodiments described above, following the DNS query in step T2/P2, the $HIP_{HH}$ of the HIP host 122 was returned to the MS 102 as part of the DNS response. Subsequently, $HIT_{HH}$ was used as the destination IP address in the session initiation message, with an appropriate translation from $HIT_{HH}$ to $IP_{HH}$ at the GGSN HIP proxy 114 before the I1 packet was sent to the HIP host 122. It will be appreciated that the actual IP address, $IP_{HH}$, could also be returned to the MS 102 as part of the DNS response so that $IP_{HH}$ could be used directly in the destination IP address field of the session initiation message. In this case, the GGSN HIP proxy 114 would need to determine that the host 122 is actually HIP enabled in some way, for example by referring to the locally-stored association between $HIT_{HH}$ and $IP_{HH}$.

In the second embodiment described above, it will be appreciated that the I1 packet header translation formed at the GGSN HIP proxy 114 results in an I1 packet not containing $HIT_{MS(GGSN)}$ at all. Therefore, in the second embodiment, the underlying format of the identifier generated by the GGSN HIP proxy 114 and associated with the HIP MS 102 is not important, with the identifier merely acting to identify the HIP MS 102. Any type of 128-bit identifier could therefore be used, with the address mapping being carried out in a similar fashion. It will also be appreciated that the GGSN HIP proxy 114 is not actually required to generate a key-pair to represent the HIP MS 102 in the second embodiment, with the HIT-like bit pattern being enough as an identifier. In the first embodiment, the identifier $HIT_{MS(GGSN)}$ is used during the HIP negotiation and therefore it must be in the correct form and associated with a key-pair. However, even in the first embodiment the identifier $HIT_{MS(GGSN)}$ does not itself need to be sent to the legacy MS 102; all that is required is that some sort of identifier relating to $HIT_{MS(GGSN)}$ is sent to the legacy MS 102 and subsequently used as the source IP address in the session initiation message. This identifier could then be linked at the GGSN HIP proxy 114 to $HIT_{MS(GGSN)}$ for use in the subsequent HIP negotiation.

It will be appreciated that operation of one or more of the MS 102, GGSN HIP proxy 114 and HIP host 122 can be controlled by a program operating on the device. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

A person skilled in the art will appreciate that embodiments of the present invention are not necessarily limited to any particular protocol or addressing scheme for each of the layers, for example in the transport or network layers, and will function within the HIP framework whatever addressing or transport protocol is used around that framework.

What is claimed is:

1. A method, performed at a gateway node forming a gateway between a first environment and a second environment, of using the Host Identity Protocol (HIP) to at least partially secure communications between a first host operating in the first network environment and a second, HIP-enabled, host operating in the second network environment, the method comprising:
    associating an identifier with the first host at the gateway node;
    storing the identifier at the gateway node;
    sending the identifier to the first host;
    receiving a session initiation message from the first host, where a source address of the session initiation message comprises the identifier, and where the session initiation message indicates that a destination of the session initiation message is the second host;
    using the stored identifier to negotiate a secure HIP connection to the second host; and
    wherein the first host is not HIP enabled and the secure HIP connection is negotiated between the gateway node and the second host.

2. The method as claimed in claim 1, wherein the identifier is generated at the gateway node.

3. The method as claimed in claim 2, wherein the identifier is generated in response to the sending of a context activation request from the first host to the gateway node.

4. The method as claimed in claim 3, wherein the context activation request is a Packet Data Protocol (PDP) context activation request to activate a PDP context, and the identifier is used as the PDP address in the PDP context.

5. The method as claimed in claim 1, wherein the first host is HIP enabled and the secure HIP connection is negotiated between the first and second hosts.

6. The method as claimed in claim 1, wherein the identifier is of the same length as an address in the addressing scheme used by the first host for communication with the gateway node.

7. The method as claimed in claim 6, wherein an IP addressing scheme is used and the identifier is used as the source IP address in the session initiation message.

8. The method as claimed in claim 1, wherein the identifier is a look-up identifier associated with a HIP identity tag generated for and associated with the first host, allowing the HIP identity tag for the first host to be retrieved at the gateway node using the look-up identifier.

9. The method as claimed in claim 8, wherein the HIP identity tag is generated from a key pair.

10. The method as claimed in claim 8, wherein the HIP identity tag is included in a HIP header during negotiation of the HIP connection between the gateway and the second host.

11. The method as claimed in claim 10, wherein the HIP identity tag is a Host Identity Tag (HIT) or a Local Scope Identifier (LSI).

12. The method as claimed in claim 1, wherein the identifier is in the form of an IP address.

13. The method as claimed in claim 1, wherein the first network environment is a mobile network environment.

14. The method as claimed in claim 13, wherein the mobile network environment is a 3G mobile environment.

15. The method as claimed in claim 14, wherein the mobile network environment is a UMTS mobile network environment.

16. The method as claimed in claim 1, wherein the second network environment is an Internet network environment.

17. The method as claimed in claim 1, wherein the gateway node provides the functionality of a HIP proxy.

18. The method as claimed in claim 1, wherein the gateway node is a Gateway GPRS Support Node (GGSN).

19. The method as claimed in claim 1, comprising replacing the identifier with an address associated with the gateway node as the source address in a subsequent message sent to the second host.

20. A method, performed at a gateway node forming a gateway between a first environment and a second environment, of using the Host Identity Protocol (HIP) to at least partially secure communications between a first host operating in the first network environment and a second. HIP-enabled, host operating in the second network environment, the method comprising:
   associating an identifier with the first host at the gateway node;
   storing the identifier at the gateway node:
   sending the identifier to the first host;
   receiving a session initiation message from the first host, where a source address of the session initiation message comprises the identifier, and where the session initiation message indicates that a destination of the session initiation message is the second host;
   using the stored identifier to negotiate a secure HIP connection to the second host; and
   wherein the identifier is a HIP identity tag.

21. A method, performed at a gateway node forming a gateway between a first environment and a second environment, of using the Host Identity Protocol (HIP) to at least partially secure communications between a first host operating in the first network environment and a second, HIP-enabled, host operating in the second network environment, the method comprising:
   associating an identifier with the first host at the gateway node;
   storing the identifier at the gateway node;
   sending the identifier to the first host;
   receiving a session initiation message from the first host, where a source address of the session initiation message comprises the identifier, and where the session initiation message indicates that a destination of the session initiation message is the second host;
   using the stored identifier to negotiate a secure HIP connection to the second host;
   wherein the identifier is a look-up identifier associated with a HIP identity tag generated for and associated with the first host at the gateway node, allowing the HIP identity tag for the first host to be retrieved at the gateway node using the look-up identifier;
   wherein the HIP identity tag is generated from a key pair; and
   wherein the key pair which is stored in the gateway node for use during subsequent HIP communications between the gateway node and the second host.

22. A communications system comprising:
   a first host operating in a first network environment,
   a second, Host Identity Protocol (HIP) enabled, host operating in a second network environment,
   a gateway node forming a gateway between the two environments,
   means for associating an identifier with the first host at the gateway node,
   means for storing the identifier at the gateway node,
   means for sending the identifier to the first host,
   means for receiving a session initiation message from the first host, where a source address of the session initiation message comprises the identifier, and where the session initiation message indicates that a destination of the session initiation message is the second host,
   means for using the stored identifier at the gateway node to negotiate a secure HIP connection to the second host; and
   wherein the identifier is a HIP identity tag.

23. An apparatus for using the Host Identity Protocol (HIP) to at least partially secure communications between a first host operating in a first network environment and a second, HIP-enabled, host operating in a second network environment, the apparatus comprising a gateway node forming a gateway between the two environments, the gateway node comprising:
   means for associating an identifier with the first host at the gateway node;
   means for storing the identifier at the gateway node;
   means for sending the identifier to the first host;
   means for receiving a session initiation message from the first host, where a source address of the session initiation message comprises the identifier, and where the session initiation message indicates that a destination of the session initiation message is the second host;
   means for using the stored identifier to negotiate a secure HIP connection to the second host; and
   wherein the first host is not HIP enabled and the secure HIP connection is negotiated between the gateway node and the second host.

* * * * *

UNITED STATES PATENT AND TRADEMARK OFFICE
CERTIFICATE OF CORRECTION

PATENT NO. : 7,873,825 B2  
APPLICATION NO. : 10/599761  
DATED : January 18, 2011  
INVENTOR(S) : Jokela et al.

Page 1 of 1

It is certified that error appears in the above-identified patent and that said Letters Patent is hereby corrected as shown below:

On the Face Page, in Field (54), in Title, in Column 1, Lines 1-4, delete "IDENTIFICATION METHOD AND APPARATUS FOR ESTABLISHING HOST IDENTITY PROTOCOL (HIP) CONNECTIONS BETWEEN LEGACY AND HIP NODES" and insert -- HOST IDENTITY PROTOCOL METHOD AND APPARATUS --, therefor.

In Column 1, Lines 1-4, delete "IDENTIFICATION METHOD AND APPARATUS FOR ESTABLISHING HOST IDENTITY PROTOCOL (HIP) CONNECTIONS BETWEEN LEGACY AND HIP NODES" and insert -- HOST IDENTITY PROTOCOL METHOD AND APPARATUS --, therefor.

In Column 11, Line 66, delete "$HIT_{MS(GCSN)}$." and insert -- $HIT_{MS(GGSN)}$. --, therefor.

In Column 12, Line 39, delete "$HIT_{MS(CGSN)}$" and insert -- $HIT_{MS(GGSN)}$ --, therefor.

In Column 12, Line 60, delete "$HIT_{MS(GCSN)}$" and insert -- $HIT_{MS(GGSN)}$ --, therefor.

In Column 12, Line 61, delete "$IP_{CGSN}$" and insert -- $IP_{GGSN}$ --, therefor.

In Column 14, Line 14, delete "HIP" and insert -- IP --, therefor.

In Column 17, Line 24, in Claim 20, delete "second." and insert -- second, --, therefor.

In Column 17, Line 29, in Claim 20, delete "node:" and insert -- node; --, therefor.

Signed and Sealed this  
Eighth Day of November, 2011

David J. Kappos  
*Director of the United States Patent and Trademark Office*